No. 872,436. PATENTED DEC. 3, 1907.
J. W. LEDOUX & N. Z. BALL.
LIQUID METER.
APPLICATION FILED APR. 20, 1906.
2 SHEETS—SHEET 1.
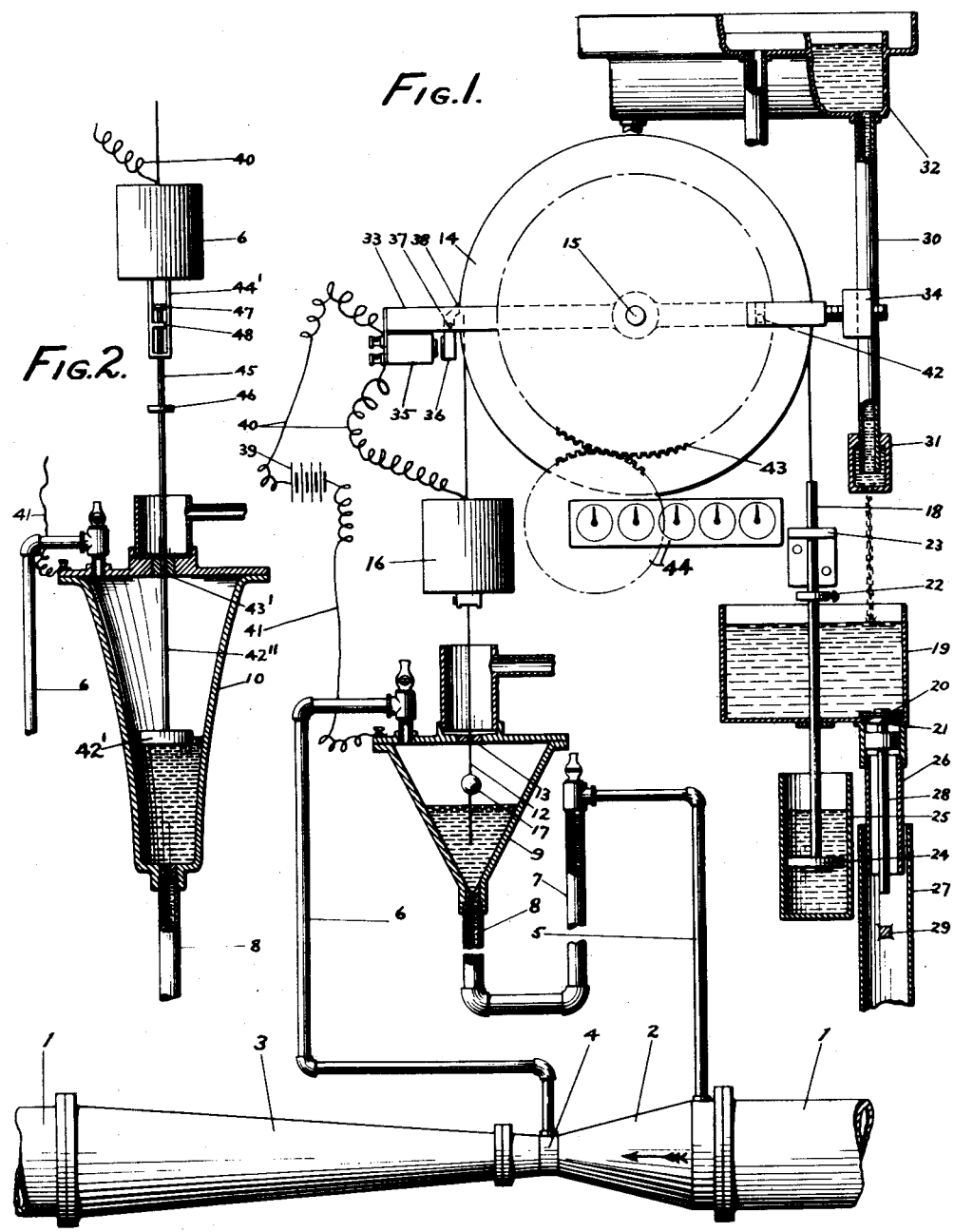
WITNESSES:
INVENTORS
BY
ATTORNEY.

No. 872,436. PATENTED DEC. 3, 1907.
J. W. LEDOUX & N. Z. BALL.
LIQUID METER.
APPLICATION FILED APR. 20, 1906.
2 SHEETS—SHEET 2.
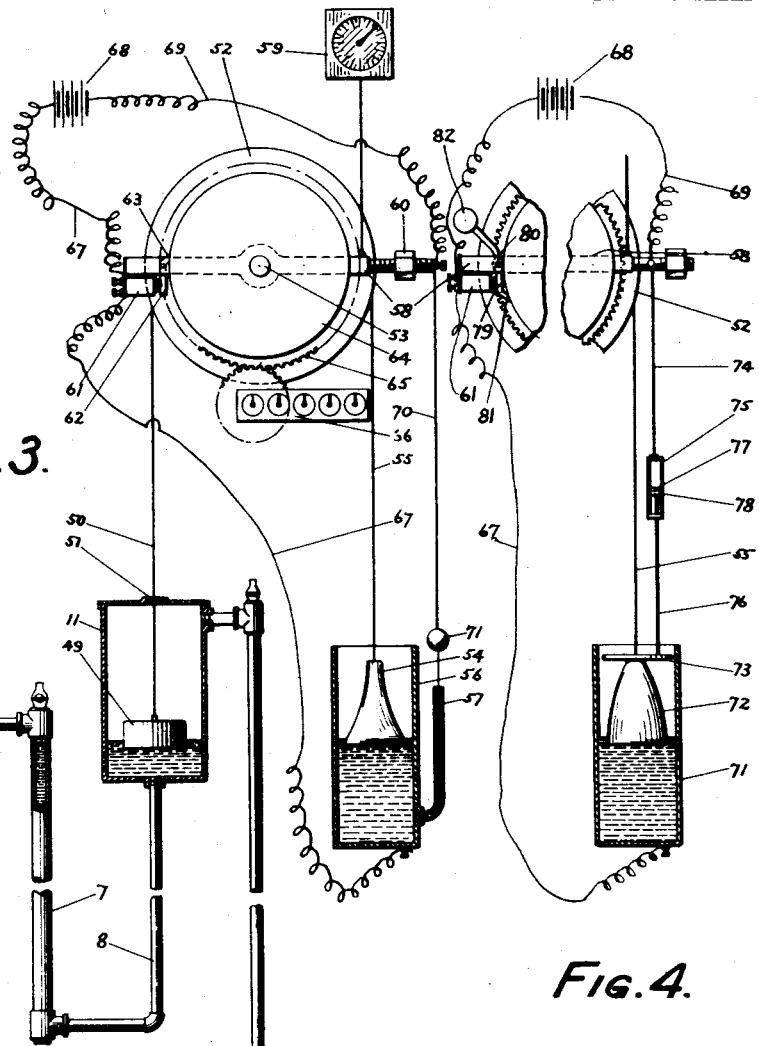
FIG. 3.
FIG. 4.
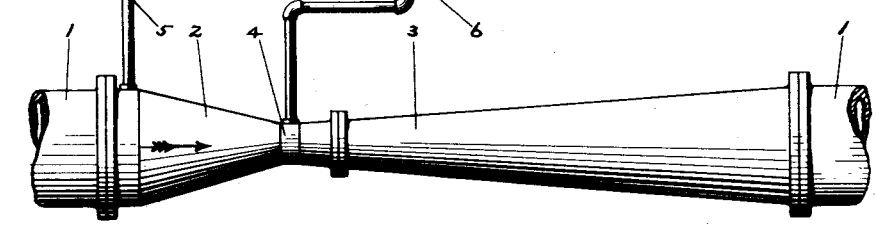
WITNESSES:
INVENTORS
BY
ATTORNEY.

UNITED STATES PATENT OFFICE.

JOHN W. LEDOUX, OF SWARTHMORE, AND NORMAN Z. BALL, OF PHILADELPHIA, PENNSYLVANIA, ASSIGNORS TO SIMPLEX VALVE & METER COMPANY, OF CAMDEN, NEW JERSEY, A CORPORATION OF NEW JERSEY.

LIQUID-METER.

No. 872,436.     Specification of Letters Patent.     Patented Dec. 3, 1907.

Application filed April 20, 1906. Serial No. 312,844.

*To all whom it may concern:*

Be it known that we, JOHN W. LEDOUX, residing at Swarthmore, in the county of Delaware and State of Pennsylvania, and NORMAN Z. BALL, residing at Philadelphia, in the county of Philadelphia and State of Pennsylvania, have jointly invented certain Improvements in Liquid-Meters, of which the following is a specification.

This invention is a meter in which a register or indicator is actuated, in proportion to the rate of flow of the liquid to be measured, by electrical mechanism under control of a circuit which is made and broken during intervals varying with the rate of flow.

The nature and characteristic features of the improvements will more fully appear by reference to the following description and the accompanying drawings in illustration thereof, of which:

Figure 1 represents a sectional elevation of our invention. Fig. 2 is a sectional elevation representing a modification in the construction of the contact mechanism shown in Fig. 1. Fig. 3 represents a sectional elevation of a further form of our invention, and Fig. 4 is a sectional elevation representing a modification in the construction of the contact mechanism shown in Fig. 3.

Referring to the drawings, a conduit 1, with the conical sections 2 and 3 contracting to a throat 4, has a tube 5 connected to a normal section and a tube 6 connected to the throat thereof, the tops of the tubes being connected by a U-shaped reservoir comprising the tube 7 connected with the top of the tube 5 and the tube 8 connected with the top of the tube 6 by a conical chamber 9 or 10, as shown in Figs. 1 and 2, or by a cylindrical or rectangular chamber 11, as shown in Fig. 3. A liquid, as mercury, heavier than that to be measured, as water, is contained in the reservoir and its respective columns are subjected to the pressure communicated from the normal and contracted sections of the conduit through the respective connecting tubes, the mercury in the chamber rising as the velocity of the flow through the conduit increases due to the increasing difference between the pressures at the normal and contracted parts of the Venturi section of the conduit.

As shown in Fig. 1, a conducting wire or slender rod 12 reciprocates through an insulating stuffing 13 in the closed top of the chamber 9 and is connected with a disk 14 which oscillates on an axis 15 through a constant arc, the wire having the tension weights 16 and 17 thereon.

To effect the oscillation of the disk, a rod 18 is connected thereto on the opposite side of the arbor from the part 12 and carries a vessel 19 provided with a valve 20 for opening and closing a port 21 in the bottom thereof. The upper part of the rod has a stop 22 thereon and works in a guide 23 in the path of the stop, the lower end of the rod extending beneath the vessel and being provided with a piston 24 which works in a dash pot 25. The vessel has a pipe 26 extending downwardly from the port 21 so as to enter a pipe 27, and the valve 20 has a stem 28 extending downwardly therefrom through the pipe 26, while the pipe 27 has a stop 29 therein for engaging first the stem 28 to lift the valve 20 and then the pipe 26 to check the vessel in its downward movement. A pipe 30, having an apertured cap 31 screwed on the end thereof, delivers water at a constant rate to the vessel 19 from a spill basin 32 which is kept constantly full. As the water clock thus formed will be reciprocated through a definite space at a constant rate by the filling and discharging of the vessel through the mechanism described, the disk 14 will be oscillated and will reciprocate the conductor 12 through a definite space at a constant rate.

Fulcrumed on the axis 15 is a lever 33 having a weight 34 on one end thereof and on the other an electromagnet 35. The electromagnet has an armature supported by the pivot 37 carried by the lever and on the armature is a pawl or clutch 38 for engaging the disk 14. A source of electric energy as a battery 39 is connected by the conductor 40 through the electromagnet 35 with the conductor 12 and by a conductor 41 with the mercury in the chamber 9, as by a connection with the chamber wall of conducting material. A clutch 42 carried by the lever 33 runs against the face of the gear wheel 43 revolving on the axis 15 and operating a register 44, the clutch running freely with reference to the gear without moving it in the movement of the lever in one direction and positively engaging the gear so as to operate it and the register in the movement of the lever in the opposite direction.

When there is no flow through the conduit, the pressure exerted through the respective tubes 5 and 6 on the corresponding mercury columns will be the same and the mercury will fall to its lowest level in the chamber 9, at which position the reciprocating conductor 12 does not make contact therewith, its circuit remains open, the lever is not engaged to the oscillating disk and the register is inactive. Flow through the conduit causes the mercury to rise in the chamber so that the reciprocating conductor makes contact therewith, closes its circuit, excites the electromagnet, operates the armature to clutch the lever to the disk until the circuit is broken by the upward movement of conductor and moves the register a distance proportional to the rise of the mercury in the chamber which is proportional to the rate of flow through the conduit.

It will be understood that the shape of the chamber is made to correspond to the equation representing the difference in pressure exerted at the normal and contracted sections of the conduit at different rates of flow.

The contact mechanism shown in Fig. 1 may be modified as shown in Fig. 2. Here the vessel 10 contains a float 42′ connected to a slender rod 42″ which reciprocates through the stuffing 43′ in the closed top of the chamber, while the weight 6 carries a guide 44′ for a pin 45 reciprocating therein and adapted to make contact with the head 46 of the rod, the pin having a head 47 thereon which makes contact with a stop 48 on the guide. When the mercury in the chamber is at its lowest level, the pin in its lowermost position does not make contact with the head of the rod and the circuit remains open. But when the mercury rises in the chamber the circuit is closed by the downward movement of the pin making contact with the head and is broken by the rise of the pin, the rate of the meter depending on the interval of contact, which depends on the rate of flow and the consequent height of mercury in the chamber.

As shown in Fig. 3, there may be used a float chamber 11 having parallel elements in combination with a float 49 therein connected by a cord or wire 50, passing through the small aperture 51 in the closed top of the chamber, with a disk 52 oscillating on the axis 53. The float 49 is counter-balanced by a conical body 54, connected by a cord or wire 55 with the disk and suspended thereby in a vessel 56 containing mercury or other suitable fluid, the vessel having a branch or tube 57 extending upwardly from a point near the bottom thereof.

On the axis 53 is mounted an oscillating lever 58 connected with a clock 59 by which it is moved through a definite arc at regular intervals, the lever being provided with an adjustable counter-weight 60 for moving it in one direction.

On the opposite end of the lever from the counter-weight is an electro-magnet 61 and a pivoted armature 62 having a clutch 63 for engaging a revolving disk 64 fixed to the revolving gear 65 for operating the register 66.

The electro-magnet is connected by the conductor 67 with the battery 68 and the vessel 56 having conducting connection with the liquid therein, while a conductor 69 connects the source of energy with the conductor 70 depending from the lever into the tube 57, a tension weight 71 being attached to the lower end of the conductor 70 to hold it in the vertical line.

When there is no flow in the conduit the mercury in the chamber 11 falls to its lowest level and the float 49 raises the body 54 to its highest position of least submergence so that the mercury in the tube 57 will fall to its lowest level, when the conductor 70 fails to make contact with the mercury so that the circuit remains open and the register inactive. When there is flow in the conduit the mercury in the chamber 11 rises with the increase in the velocity of flow, lifting therewith the float 49 and lowering the body 54, the latter being so shaped that its displacement raises the surface of the liquid proportionately to the change in the velocity of flow in the conduit. Consequently the higher the velocity of flow the longer distance through which the oscillating lever 58 will, by the engagement of the armature 62 with the disk 64, move the register at each oscillation, the movement of the register ceasing upon the release of the armature 62 when the circuit is broken in the upward movement of the conductor 70.

The contact mechanism shown in Fig. 3 may be modified as shown in Fig. 4, where the vessel 71 contains the conical body 72, having a contact member 73, suspended by the wire or cord 55 from the disk 52, while the lever 58 carries the conductor 74 provided with a guide 75 in which reciprocates a pin or rod 76 adapted to make contact with the part 73, the pin having a head 77 which engages a stop 78 of the guide. The body is so shaped that its fall, due to the rise of velocity of flow in the conduit, will be proportional thereto and so that the interval of closed circuit decreases therewith. When the flow is zero the body 72 will be at its highest position, at which time the rise of the lever 58 will not break the circuit and when the flow is highest the circuit remains open longest. The electromagnet 61 on the lever 58 acts upon an armature 79 pivoted on the pin 80 and having a pawl or clutch 81 thereon which positively engages the disk 64 through the action of a weight 82 as the lever moves it downward and slips as it is moved upward, the electro-magnet drawing back the armature to disengage the pawl when the circuit is closed. Consequently the distance through which the disk and the register will be moved at each downward oscillation of the pawl will be proportional to the length of time the circuit is open which is proportional to the velocity of flow in the conduit.

Having described my invention I claim:

1. A meter comprising a column of liquid variable with variations in the flow to be measured, a circuit adapted to be made and broken during intervals varying with variations in said column and means whereby said circuit is made and broken.

2. A meter comprising a column of liquid variable with variations in the flow to be measured, electrical mechanism having a circuit with a reciprocating contact, means whereby said circuit is made and broken and apparatus whereby the intervals of making and breaking the circuit vary with variations in said column.

3. A meter comprising an indicating mechanism, a device alternating in a path of movement at regular intervals, apparatus for engaging and disengaging said device with relation to said mechanism, electrical mechanism for operating said apparatus and means whereby a flowing liquid regulates the action of said electrical mechanism.

4. A meter comprising an indicating mechanism, an oscillating mechanism, an electromagnet, means whereby said electromagnet engages and disengages said oscillating mechanism with relation to said indicating mechanism, a circuit connected with said electromagnet, and means comprising a column of liquid for making and breaking said circuit.

5. A meter comprising a fluid conduit, a reservoir connected with said conduit and containing a fluid heavier than the fluid in said conduit, an indicating mechanism, an oscillating lever, apparatus for engaging and disengaging said lever in relation to said indicating mechanism, to actuate the latter, and electrical mechanism under control of the fluid in said reservoir for operating said apparatus.

6. A meter having, in combination with a fluid conduit and a fluid column connected therewith, an indicating mechanism, and means for operating said indicating mechanism at a rate variable with variations in said column, said means comprising a circuit with a reciprocating contact.

7. A meter comprising a pair of oscillating members, an electromagnet having an armature with means for engaging said oscillating members together, and a reciprocating circuit making and breaking contact connected with said electro-magnet.

8. A meter comprising a pair of members each having an alternating movement, means for effecting the alternating movement of one of said parts at regular intervals, electrical mechanism for engaging the other of said parts to said regularly moving part, and a circuit for said electrical mechanism, said circuit comprising a reciprocating contact and a fluid column.

9. A meter comprising a fluid conduit, a pressure reservoir having a chamber containing a fluid heavier than that in said conduit, a slender device reciprocating through an opening in the top of said chamber, an oscillating device supporting said slender device, a second oscillating device, an electromagnet having an armature with means for engaging one of said oscillating devices to the other, a circuit comprising a reciprocating contact, and a fluid column variable with the flow through said conduit.

In testimony whereof we have hereunto set our names this 18th day of April, A. D. 1906, in the presence of the subscribing witnesses.

JOHN W. LEDOUX.
NORMAN Z. BALL.

Witnesses:
ROBERT JAMES EARLEY,
JOS. G. DENNY, Jr.